T. T. CHALONER.
RESILIENT WHEEL.
APPLICATION FILED SEPT. 27, 1917. RENEWED FEB. 4, 1920.
1,347,442.
Patented July 20, 1920.
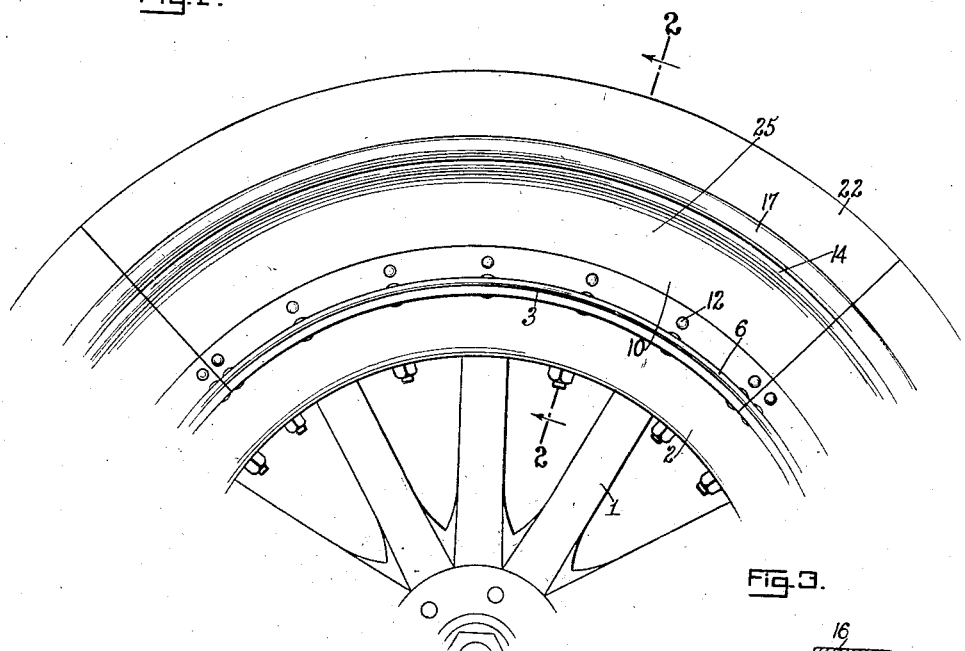
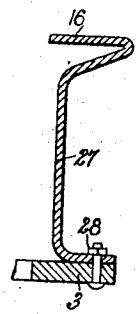
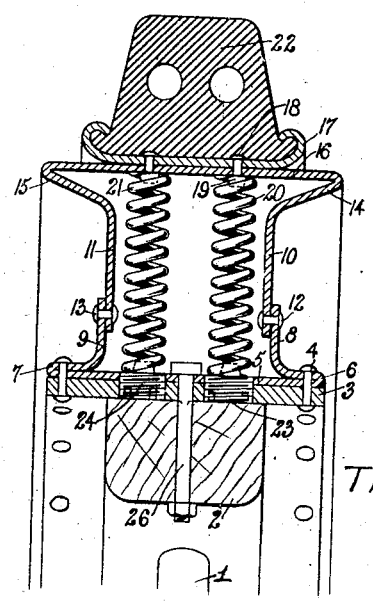
WITNESSES
INVENTOR
Thomas T. Chaloner
BY
ATTORNEYS

UNITED STATES PATENT OFFICE.

THOMAS T. CHALONER, OF NEW YORK, N. Y.

RESILIENT WHEEL.

1,347,442. Specification of Letters Patent. Patented July 20, 1920.

Application filed September 27, 1917, Serial No. 193,574. Renewed February 4, 1920. Serial No. 356,121.

*To all whom it may concern:*

Be it known that I, THOMAS T. CHALONER, a citizen of the United States, and a resident of the city of New York, borough of Manhattan, in the county and State of New York, have invented a new and Improved Resilient Wheel, of which the following is a full, clear, and exact description.

This invention relates to resilient wheels, and has for an object the provision of an improved construction whereby a resilient effect may be secured and at the same time any skidding or side strain taken up without injury to any of the parts.

A further object in view is to provide a resilient wheel with a set of springs and a casing therefor formed at the outer part so as to give sufficiently to allow a proper action of the springs.

Another object in view is to provide a resilient wheel formed in sections capable of independent removal from the wheel to which they are secured.

In the accompanying drawings:

Figure 1 is a side view of part of a wheel disclosing an embodiment of the invention.

Fig. 2 is a section through Fig. 1 on line 2—2, same being on a slightly enlarged scale.

Fig. 3 is a detail fragmentary sectional view showing a part of the supporting casing and disclosing a slightly modified form of the invention.

Referring to the accompanying drawing by numerals, 1 indicates a wheel body of any desired kind having a felly 2, to which the annular ring or plate 3 is secured, said ring or plate being divided into sections as shown in Fig. 1. It is, of course, understood that any desired number of sections may be used. The idea of making the parts into sections is to provide a structure whereby an injured part may be removed and a new part substituted without providing a complete new structure. Connected with the plate 3 by bolts 4 is a band 5, bent at 6 and 7 so as to produce outstanding annular flanges 8 and 9 to which depending side members 10 and 11 are secured by rivets or other securing means 12 and 13. The side members 10 and 11 merge into yielding sections 14 and 15 which act as springs. The yielding sections 14 and 15 merge into a rim 16 to which the clenching member 17 is secured in any suitable manner, as for instance, rivets 18, said rivets preferably having large ends 19 so as to center the springs 20 and 21. The rubber tire 22 is mounted in member 17, said tire and rim being of any desired construction. It is, of course, understood that the clenching member, tire, members 8 and 9 and the side members 10 and 11 and associate parts are cut so as to produce sections. The plate 3 is cut as shown in Fig. 1 so that an entire section may be removed and a new one substituted at any time. The band 5 and the plate 3 are provided with threaded apertures normally accommodating the plugs 23 and 24, which plugs have enlarged ends for securing springs 20 and 21 as shown in Fig. 2. When the entire section 25 is removed these plugs may be unscrewed and any or all of the springs removed and new ones substituted. A number of bolts 26 extend through the rim or plate 3 and also through the felly 2 so as to arrange plate 3 and associate parts with the felly. When the bolts 26 are removed and sections are removed the plugs 23 and 24 are removed for securing access to the springs. It will be noted that the springs allow the free up and down movement, but are covered so as to be free from water, mud and other objectionable matter when in actual use.

In Fig. 3 will be seen a modified form of the invention in which the rim 16 merges into side plates 27, which in turn merge into bottom flanges 28, held in place by suitable bolts 4'. This construction and arrangement eliminates the rivets or other securing means 12 and 13 and also eliminates the band 5. Upon the removal of the bolts 4' in any section said section may be quickly and easily removed without molesting the bolts 26.

What I claim is:

1. In a resilient wheel of the character described, a plate, means for securing said plate to the felly of a wheel, a casing rigidly secured to said plate and provided with flexible portions at the outer part merging into a rim section, a plurality of springs arranged in said casing with their outer ends engaging said rim section for resiliently holding the same in a given position, and means for connecting a tire to the outer part of said rim section.

2. In a resilient wheel of the character described, an annular plate divided into sections, means for securing said plate to a felly, an annular band rigidly connected to said plate on the outer face, said band being provided with bent edges and a pair of outstanding annular flanges, said band being divided into sections of substantially the same length as the plate sections, a casing provided with a rim member, yielding sections at the edges of the rim member and a pair of depending flanges extending from the yielding sections, means for connecting said depending flanges with the outstanding flanges of said band, a plurality of springs arranged in said casing and acting on said band and plate and on said rim member for resiliently holding the rim member in a given position, and means on the outer part of said rim member for connecting a tire thereto.

3. A resilient tire divided into sections comprising a plate divided into a plurality of independent sections, a band fitted against the outer face of said plate; said band being divided into the same number of sections as said plate, securing means extending through said plate and through said band for clamping the band in position, said band having a pair of spaced outstanding flanges, a casing divided into the same number of sections as said plate rigidly secured to said outstanding flanges, said casing extending outwardly and formed with a pair of resilient sections substantially V-shaped in cross section, said sections being joined by a rim, means on said rim for securing a tire thereto, a plurality of springs arranged in said casing for resiliently holding said casing in a predetermined position, and means for removably securing each of said sections to the felly of a wheel.

THOMAS T. CHALONER.